United States Patent [19]

Curran, Jr.

[11] Patent Number: 4,520,304

[45] Date of Patent: May 28, 1985

[54] THREE PHASE SCALING CURRENT-TO-VOLTAGE CONVERTOR

[75] Inventor: Earl J. Curran, Jr., South Milwaukee, Wis.

[73] Assignee: Square D Company, Palatine, Ill.

[21] Appl. No.: 431,920

[22] Filed: Sep. 30, 1982

[51] Int. Cl.³ .............................................. H02P 5/00
[52] U.S. Cl. ..................................... 318/800; 318/798
[58] Field of Search ...................... 318/798–811, 318/434, 729, 395, 317; 361/30, 79, 24, 31, 87; 323/277, 280

[56] References Cited

U.S. PATENT DOCUMENTS

| | | | |
|---|---|---|---|
| 3,526,819 | 9/1967 | Graf | 318/434 |
| 3,603,856 | 6/1969 | Zalar | 318/434 |
| 4,016,468 | 4/1977 | Graf | 318/434 |
| 4,106,069 | 8/1978 | Trautner | 361/30 |
| 4,123,792 | 10/1978 | Gephart et al. | 361/30 |
| 4,156,162 | 5/1979 | Warfield et al. | 318/434 |

Primary Examiner—E. A. Goldberg
Assistant Examiner—Art Evans
Attorney, Agent, or Firm—Richard T. Guttman; Donald P. Reynolds; James W. Potthast

[57] ABSTRACT

An induction motor controller with a scaling convertor for both providing selective alteration of the overload sensitivity characteristic of the controller and converting the input current to a proportional control voltage. The feedback circuit includes a plurality of feedback resistors which are selectively connectable between the output of the current-to-voltage convertor and its input to selectively change its gain and thus the sensitivity of the controller.

1 Claim, 3 Drawing Figures

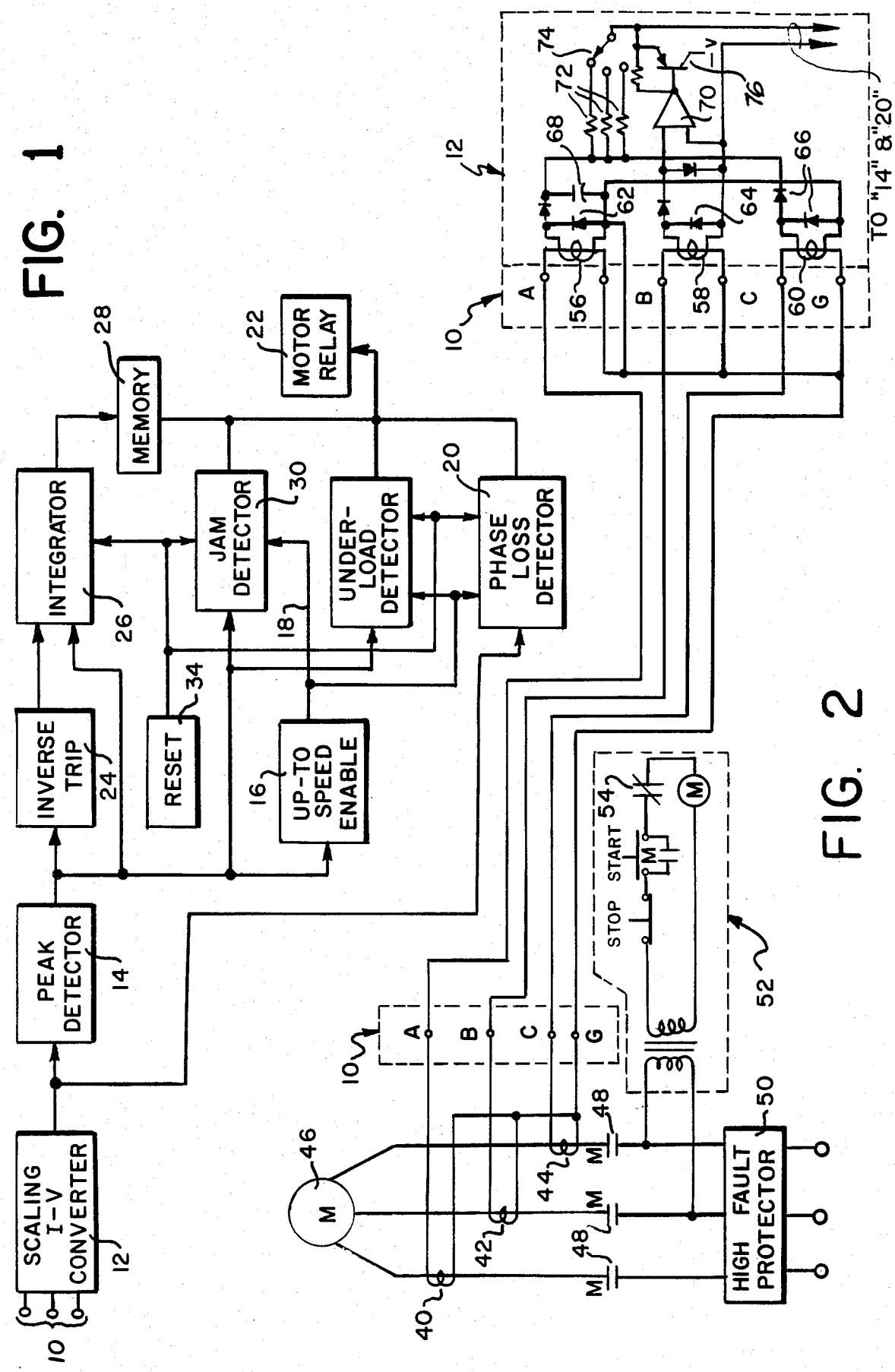

THREE PHASE SCALING CURRENT-TO-VOLTAGE CONVERTOR

BACKGROUND OF THE INVENTION

This invention relates to motor controllers for induction motors and, more particularly, such motor controllers which have means for selectively adjusting the overload current value at which protective action is taken by the controller.

Different motors, of course, have different overload characteristics. Accordingly, a need exists to adjust the controller, so that it will respond to different overload currents.

In known circuits, the line current to the motor is monitored by means of one or more current transformers coupled to the active portion of the controller. The active part of the controller, however, requires voltage signals for control operations. Consequently, the input current monitoring signal must be converted to a proportionate voltage signal. In addition, the proportionate voltage signal must be adjustable to scale it for motors of different overload characteristics.

In known controllers, the above two functions have been done by means of separate circuits: one circuit for converting the input current to a corresponding voltage signal and another circuit for selectively altering the proportionate ratio of the input current monitoring signal and voltage control signal.

SUMMARY OF THE INVENTION

The principal object of the present invention is to provide a motor controller for an induction motor in which the control voltage signal is produced by means associated with means for selectively altering the overload current sensitivity of the controller, so that the number of components and complexity of the circuits are reduced and reliability and accuracy are improved with respect to known controllers.

In keeping with this objective, a motor controller having means for producing an input current signal and means responsive to a voltage control signal for disconnecting power from a motor being controlled is provided with a scaling convertor for producing said voltage control signal as described below. The convertor has means for rectifying the input current signal, means for converting the rectified current signal to a voltage signal that is proportional to the rectified current signal, and a means for selectively altering the gain of the current-to-voltage convertor.

In a preferred embodiment, the altering means includes a plurality of feedback resistors connectable with the current-to-voltage convertor to change its gain and a switch for selectively connecting different ones of said resistors in feedback relationship.

BRIEF DESCRIPTION OF THE DRAWINGS

The foregoing features and advantages of the present invention will be described in greater detail and further features and advantages will be made apparent from a reading of the following detailed description which is given with reference that the several views of the drawing, in which:

FIG. 1 is a functional block diagram of a preferred embodiment of the scaling convertor; and FIG. 2 and FIG. 2a are a circuit schemtic diagram corresponding to the functional block diagram of FIG. 1.

DETAILED DESCRIPTION

Figure 2A:
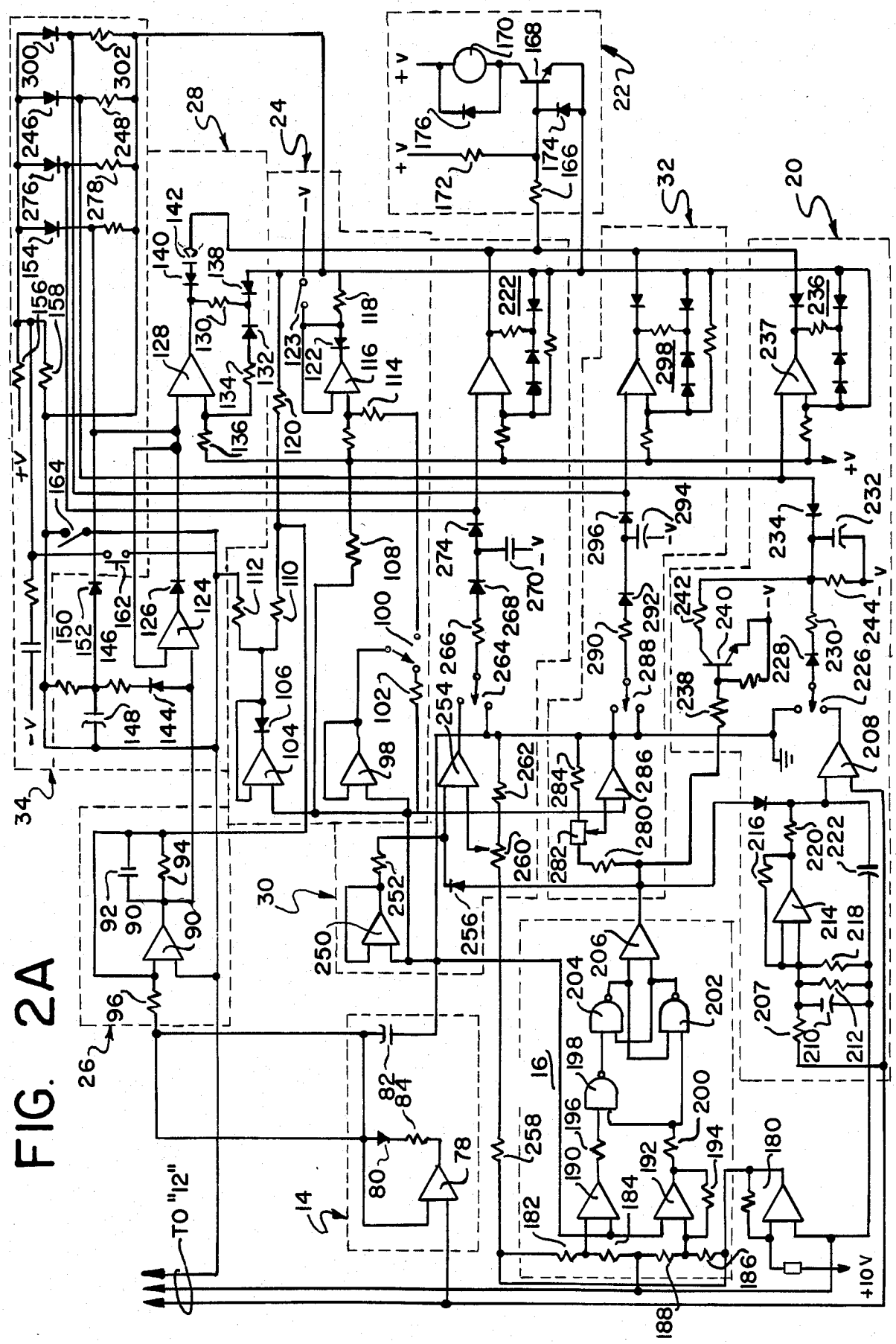

FIG. 1 is an overall block diagram of a circuit for the practice of the present invention. In FIG. 1, terminals 10 receive a signal that is proportional to the current flow into a motor being controlled (not shown). Three terminals 10 are provided to accomodate a three-phase electrical supply commonly used to drive electric motors of three or more horse power. Preferably, a current transformer is coupled with each of the motor power leads to provide a signal that is proportional to the current in each phase that is supplied to the motor. Alternately, only a single current transformer is coupled to only one of terminals 10, if the motor is a single-phase motor or if the user does not wish to protect against the loss of one or more phases.

The current signal at terminals 10 are applied to the scaling current-voltage converter 12 which produces an output voltage that is proportional to some measure of the current at terminals 10. In the event of three current input signals the current-voltage converter 12 produces a voltage that is proportional to the sum of the currents applied at terminals 10 after they have been rectified. Converter 12 also has means associated with the voltage producing means to scale the input values, so that the same level of output voltages may be produced for varying values of inputs at terminals 10. This allows the circuit of FIG. 1 to be used to control motors over a range of rated values.

The output signal from the scaling current-voltage converter 12 is connected to peak detector 14 which produces a signal that is proportional to the peak value of this input voltage. The output signal from peak detector 14 is coupled to up-to-speed enable circuit 16 which generates on line 18 a signal indicating that a motor being started is up to speed. The signal on line 18 is taken to enable various portions of the circuit. One of these is phase-loss detector 20, which receives an input signal from the output of scaling current-voltage converter 12. If there is a loss of one phase after the motor is up to speed, phase-loss detector 20 generates a signal that opens motor relay 22.

The output of peak detector 14 is applied to two basic types of circuits. One type is effective during starting and after the motor is up to speed. The other type is enabled only after the motor is running. The first of these circuits applies the output of peak detector 14 to inverse trip circuit 24 and also to integrator 26. Inverse-trip circuit 24 selects an appropriate trip curve to control the level of signal applied to integrator 26. The output of peak detector 14 is integrated in integrator 26 to produce an output that is a short-term product of current and time. Integrator 26 is so designed that if the current-time product during start or after achieving an up-to-speed condition exceeds a predetermined value, an output signal will be sent through memory 28 to motor relay 22 to trip the relay. The length of time allowed for an overcurrent on a motor start is selected in inverse trip circuit 24. The scale of scaling current-voltage converter 12 is selected, so that the desired full-load current of the motor generates at integrator 26 an input signal that is constant at a value that is not sufficient to trip motor relay 22.

When voltage is applied to the leads of a stopped motor, current rises to some value that is typically as much as six to eight times the rated full-load current of the motor. The controller of FIG. 1 must allow this overload for a short period of time but not so long as to cause damage to the motor. Integrator 26 is controlled from inverse trip circuit 24. Scaling current-voltage converter 12 provides for the application of a lesser overload for a longer time or a larger overload for a lesser time. It functions in the same manner if a sustained overload occurs after the motor has reached operating speed.

Protection against different problems is provided. In some applications, a motor may drive a load that is subject to being jammed, such as a rock crusher, or the like. A jam detector 30 protects the motor against this condition by stopping it in the event of a jam. Jam detector 30 of FIG. 1 receives an input signal from peak detector 14 that is proportional to motor current. After jam detector 30 is enabled by a signal on line 18 indicating that the motor is up to speed, a jam is represented at the input to jam detector 30 as a sudden increase in motor current. This causes jam detector 30 to send a cutoff signal to motor relay 22.

In some types of load an underload detector 32 protects the motor in response to the detection of underload. After being enabled by a signal on line 18, underload detector 32, detects a drop in motor current from its input signal in response to an underload condition. When underload detector 32 receives a signal from peak detector 14 indicating a reduction or a loss of load current, it generates a signal that cuts off motor relay 22.

Protection of a motor against a quick restart when it has been tripped out by an overload that is followed by a momentary loss of power to the controller is also provided. This function is accomplished by memory 28 which receives an input from integrator 26 and produces a controlling output for motor relay 22. One output from memory 28 has results from a starting overcurrent from integrator 26. If integrator 26 then produces a signal indicating overload that trips motor relay 22, memory 28 will hold motor relay 22 in an "off" position for a predetermined period of time. This allows the motor to cool following a momentary power failure. A reset 34 enables integrator 26 and detectors 20, 30, and 32 after a trip.

Referring now to FIG. 2, the preferred circuitry for implementing the functional blocks of FIG. 1 will be described. Terminals 10 of FIG. 1 represent in FIG. 2 the terminals A, B, C, G that are connected to current transformers 40, 42, and 44. These current transformers together measure the load current to motor 46. That motor current is interrupted by contactors 48 and high-fault protector 50, a circuit breaker or other device designed to trip on a short circuit or other extreme overload. One phase of the power applied to motor 46 is taken to the start circuit 52. A normally closed contactor 54 is controlled by the circuit of the present invention.

Each of the terminals A, B, and C is connected to a current transformer 56, 58, and 60 respectively. The outputs of the current transformers are rectified by diode arrays 62, 64, and 66, respectively. These diode arrays half-wave rectify the motor current signals. The rectified current signals are applied to a negative input of an operational amplifier 70 of scaling current-voltage convertor 12. Gain of operational amplifier 70 is controlled by selecting an appropriate feedback resistor 72 with switch 74. The output of operational amplifier 70 drives transistor 76 which produces a proportionate output voltage. A portion of this output voltage is applied through switch 74 and a selected feedback resistor 72 to provide negative feedback to operational amplifier 78.

The output of transistor 76 is also applied to peak detector 14. The input to peak detector 14 is applied to operational amplifier 78 which in combination with diode 80 comprises the equivalent of an ideal diode to charge capacitor 82. Resistor 84 limits the charging current to protect diode 80. As a result, a voltage is developed across capacitor 82 that is a scaled equivalent of the peak values of the currents detected at current transformers 56, 58, and 60.

The output of peak detector 14 is applied through resistor 96 to an input of integrator 26. Integrator 26 comprises an operational amplifier 90 with an integrating capacitor 92 and resistor 94. When capacitor 92 is uncharged, and a voltage is applied at the output of peak detector 14, indicating that a motor is drawing current, integrator 26 generates a ramp at the output of operational amplifier 90. This ramp levels off at a voltage that is determined by the ratio of resistances of resistors 94 and 96. The values of resistors 94 and 96 and capacitor 92 are chosen to permit the flow of a stated overload percentage of motor current for a predetermined time. This is typically six times 115 percent of the rated full-load current for a time that is under thirty seconds. This is referred to as a Class 30 start. If the load current is too high for the permitted length of time, or if the maximum current persists for an excessive length of time, the voltage at the output of operational amplifier 90 will be increased to a value that is sufficiently high to cause motor relay 22 to trip. The mechanism of this will be seen later.

A class 20 start characteristic is accomplished by inverse trip circuit 24. The output of peak detector 14 is applied to an input of operational amplifier 98, connected as a buffer. The output of operational amplifier 98 is applied to switch 100 which has three positions, Class 30, Class 20, and Class 10. When switch 100 is set to Class 30, there is no further use of the output of operational amplifier 98, and the output of integrator 26 is used as described above to operate motor relay 22. When switch 100 is set to select Class 20, the output of operational amplifier 98 is taken through resistor 102 to operational amplifier 104. Diode 106 is connected to the output of operational amplifier 104. The combination of resistors 108, 110, and 112 sets a voltage level that causes diode 106 and hence operational amplifier 104 to be switched off unless the current exceeds a predetermined value that is typically taken as twice the rated full-load current. When this value is exceeded, an additional voltage is applied through resistor 110 to an input of the integrator 26. This adds drive to operational amplifier 90, increasing the slope of the ramp, and thus reducing the trip time.

If it is desired to limit the overload time to ten seconds or less, switch 100 is operated to select Class 10. This applies the output of operational amplifier 98 through resistor 114 to operational amplifier 116. Here a different combination of resistors 118 and 120 combines with resistors 114 and 116 to switch diode 122. As before, the effect is to increase the charging rate of capacitor 92 of integrator 26. For a given overload current this limits the amount of time that it can be applied before integrator 26 generates a signal to trip motor relay 22.

This signal is also applied as an overload test by closing switch 123 to cause motor relay 22 to trip in about ten seconds. The output of integrator 26 is taken to control motor relay 22 through memory 28. It is applied to a terminal of operational amplifier 124 which is connected to diode 126 and is operated in a feedback mode. This has the effect of making diode 126 appear to be an ideal diode. Diode 126 is connected to supply an input to operational amplifier 128. Resistor 130 is connected from the output of operational amplifier 128 to diode 132 and resistor 134 hence to a negative input of operational amplifier 128. Resistor 136 connects the negative input terminal of operational amplifier 128 to a precision voltage supply. Diode 138 as connected from the junction of resistor 130 and diode 132 to a common point.

Operational amplifier 128 and the elements connected to it comprise a trip latch circuit that holds diode 140 off as long as the input voltage to operational amplifier 128 from operational amplifier 124 is less than some nominally selected voltage. If that voltage is exceeded, diode 140 is caused to conduct operating light-emitting diode (LED) 142 and operating motor relay 22. Three things may cause this condition. The first is an excessive output from operational amplifier 124 indicating that integrator 26 has sensed an excessive combination of time and overload current. A second cause of such operation is a memory voltage. The output of operational amplifier 90 is taken through diode 144 and resistor 146 to charge capacitor 148. Resistor 150 is in parallel with capacitor 148. The capacitor voltage is taken through diode 152 which operates as a logical OR at the input to operational amplifier 128. A third input to operational amplifier 28 is from reset circuit 34. This applies the voltage on reset bus that is known as 154 through diode 156 to reset the latch of which operational amplifier 128 is an input. Reset bus 154 is normally held at some positive voltage determined by the ratio of resistors 156 and 158 which form a voltage divider. A reset signal, generated manually by switch 162 or automatically by leaving switch 164 closed will reduce the voltage at the input to operational amplifier 28. This will reset the latch unless capacitor 92 has not yet had time to discharge through resistor 94. This is the memory of recent operation or overload that prevents a restart until the motor has had a predetermined time to cool.

Diode 140 serves as a logical OR on the input to motor relay 22. This includes an input resistor 166 that is connected to the base of a transistor 168 to control current to a relay coil 170. This controls the normally closed contact 54. Resistor 172 and diode 174 establish bias conditions of the operation of transistor 168. Diode 176 protects transistor 168 against current spikes.

The portions of the circuit of FIG. 2 that have been described above relate to the functions of protection against overload during a start and during normal operation and also protection against an undesired restart following a loss of power. The remaining functions of the circuit come into play only when the motor is up to speed. These functions are controlled by the up-to-speed enable circuit 16. Referring to FIG. 2, an inverter 180 provides a controlled negative voltage that is applied across resistors 182 and 184 to ground and also across resistors 186 and 188 to ground. The divided reference voltages that result are applied to the negative input of operational amplifier 190 and the positive input of operational amplifier 192, respectively. Feedback resistor 194 is applied around operational amplifier 192. The output of peak detector 14 is applied to the other inputs to operational amplifiers 190 and 192. The output of operational amplifier 190 is taken through resistor 196 to NAND gate 198, and the output of operational amplifier 192 is coupled through resistor 200 to an input of NAND gate 198 and an input of NAND gate 202. The output of NAND gate 198 is applied to NAND gate 204. NAND gate 204 is connected to NAND gate 202 to form, together with operational amplifier 206, a set-reset flipflop. Values of resistors 182, 184, 186, and 188 are typically chosen, so that enable circuit 16 produces no output from operational amplifier 206 when the controller is turned on and until current to a motor that is being started rises to a value of the order of six times rated load current. However, those values are chosen so that the flipflop is set when motor current passes through the reference value corresponding to twice the full-load current on its way to the maximum value. The flipflop is then reset on a decrease of that current to a reference value corresponding to 115 percent of rated full-load current. At this point operational amplifier 206 produces an output that is applied to line 18 to enable various other portions of the circuit.

One circuit that is enabled by up-to-speed enable circuit 16 is phase-loss detector 20. It receives an input signal from scaling current-voltage converter 12 that is also applied to resistor 206 and to operational amplifier 208. This input is a voltage that is the logical sum of the rectified motor currents. It thus has both DC and AC components. The AC components are filtered out by capacitor 210 and resistor 212, and the DC component is applied to operational amplifier 214. Feedback resistor 216 and reference resistor 218 complete the connection of operational amplifier 214 to apply to resistor 220 a voltage that is proportional to the average value of motor currents. That value is further filtered by capacitor 222.

An enable signal is coupled to operational amplifier 208 through diode 224 which is operated by the signal on line 18 when operational amplifier 208 is enabled and the phase loss detector is placed in the circuit by switch 226. Current pulses are coupled through diode 228 and resistor 230 to charge capacitor 232 in the event of a phase loss. When there is no phase loss, operational amplifier 208 is disabled by the output voltage of operational amplifier 214. The phase loss is represented by a sudden change of the input voltage to the positive terminal of operational amplifier 208. That change will not be followed immediately by operational amplifier 214, and pulses will therefore be passed by operational amplifier 208 to charge capacitor 232.

The voltage across capacitor 232 is coupled through diode 234 to latch circuit 236 which operates in a manner identical to the latch circuit containing corresponding components in memory 28. The output of latch circuit 236 is taken as an input to motor relay 22, the operation of which is described above. A further alternative is provided to avoid false indications of phase loss in starting motors with reduced-voltage starters or under loads requiring less than full torque. In this alternative, the output of up-to-speed enable detector 16 is applied through resistor 238 to transistor 240. When transistor 240 is switched on by a signal through resistor 238, capacitor 232 is discharged rapidly through resistor 242. This is a faster discharge than its normal discharge through resistor 244 which keeps small changes in load current from accumulating to provide a false trip indicating a loss of phase. Latch circuit 236 is reset when capacitor 232 discharges just below the reset level of operational amplifier 237. The reset voltage level is established when the output of operational amplifier 237 switches, tripping motor relay 22 after a phase loss, turning on diodes 239 in latch 236.

Jam detector 30 is designed to trip out a motor when its current suddenly increases, indicating that its load has jammed or otherwise increased to a point beyond the capacity of the motor. Jam detector 30 receives a signal that is proportional to load current from peak detector 14. That signal is applied as an input to operational amplifier 250 which together with resistor 252 comprises a buffer. A signal from resistor 252 is taken as one input to operational amplifier 254 which is enabled through diode 256 by a signal from line 18.

Resistor 258, potentiometer 260 and resistor 262 comprise a voltage divider that applies a control voltage to the positive input terminal of operational amplifier 254. The setting of potentiometer 260 determines the percentage overload on which the motor will trip to indicate a jam. The output of operational amplifier 254 is selected by switch 264 and applied through resistor 266 and diode 268 to charge capacitor 270 in case of a jam. This enables latch circuit 272 through diode 274 to operate motor relay 22. Latch circuit 272 operates like latch circuit 236 and the latch circuit of memory 28, described above.

Underload circuit 32 is designed to cut off the motor that has been at speed and loses its load. In circuit 32, resistor 280 is connected in series with potentiometer 282 and resistor 284 to form a voltage divider between line 18 and ground. A setting of potentiometer 282 determines the percent underload that will trip the motor after it has come to speed. That voltage is applied as one input to operational amplifier 286, the other input of which is the output of peak detector 14. The output of operational amplifier 286 is selected by switch 288 and applied through resistor 290 and diode 292 to charge capacitor 294. The voltage on capacitor 294 is coupled through diode 296 to latch circuit 298 which functions like latch circuits 236 and 272 to operate motor relay 22.

In using the controller of the present invention, a high-fault protector 50 is selected that will trip on some value of current that is greater than the maximum amount of current that motor 46 is to draw on starting. The user then establishes connections, as shown, to motor 46, selecting combinations of current transformers 40, 42, 44, 56, 58, and 60 so that the divided motor phase current is in a range of 2.1 to 5.0 amperes. The desired divided value of motor full-load current is selected by switch 74. Switch 100 is then set to the desired class of operation, class 10, 20, or 30. This comprises limiting the period of motor overload to be less than 10, 20, or 30 seconds respectively during an across the-line cold start. Switch 123 is opened to provide normal operation and switch 164 is operated to select manual or automatic reset. Switch 226 is used to select the phase-loss function if desired. Switch 264 is set to select a jam function if desired. If the jam function is thus selected, potentiometer 260 is adjusted to the desired percentage of overload to be allowed before the jam switch trips motor relay 22. Switch 288 is operated to select the underload feature if this is desired. If switch 288 is used to select the underload feature, potentiometer 282 is set to the desired percent underload. Contactor 54 is then placed in series with the other elements of start circuit 52 and the motor is ready for controlled service. The overload feature is tested with the motor off by closing switch 123. Light-emitting diode 142 should light and motor relay 22 should operate within ten seconds to show that the circuit is functioning properly.

I claim:
1. In an induction motor controller for a three-phase motor, the controller including means responsive to a voltage control signal for disconnecting power for a motor being controlled, a converter for producing the voltage control signal comprising:
   a plurality of current transformers (56, 58, and 60), one of each of the plurality connected to monitor current in one phase of the motor being controlled;
   a plurality of diodes (62, 64, and 66) one of each of the diodes connected across one of each of the current transformers and one of each of the diodes connected to one of each of the current transformers to constitute with the others a half-wave rectifier;
   a capacitor (68) connected to each of the rectifying diodes and to each of the current transformers to comprise with the diodes a peak current detector;
   an operational amplifier (70) connected to the capacitor and receiving from it a voltage that is proportional to the rectified current that is detected by the current transformers;
   a plurality of resistors (72), selected individually by a switch (74) so that one of the resistors is selectable to adjust gain of operational amplifier (70); and
   a drive transistor (76) connected to receive as an input the output of operational amplifier (70) and connected to produce as an output the voltage control signal.

* * * * *